(12) United States Patent
Ikeda et al.

(10) Patent No.: US 10,581,294 B2
(45) Date of Patent: Mar. 3, 2020

(54) VEHICLE ELECTRIC MOTOR HOUSING DEVICE

(71) Applicant: TOYOTA JIDOSHA KABUSHIKI KAISHA, Toyota-shi, Aichi (JP)

(72) Inventors: Akihiko Ikeda, Miyoshi (JP); Kazuya Shiozaki, Nisshin (JP); Atomi Arakawa, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 15/987,135

(22) Filed: May 23, 2018

(65) Prior Publication Data

US 2018/0342920 A1 Nov. 29, 2018

(30) Foreign Application Priority Data

May 25, 2017 (JP) .................. 2017-104026

(51) Int. Cl.
| | |
|---|---|
| *H02K 5/08* | (2006.01) |
| *B60K 6/26* | (2007.10) |
| *B60K 6/445* | (2007.10) |
| *B60K 6/405* | (2007.10) |
| *B60K 6/40* | (2007.10) |
| *H02K 7/116* | (2006.01) |
| *H02K 7/14* | (2006.01) |
| *H02K 5/16* | (2006.01) |

(52) U.S. Cl.
CPC .............. *H02K 5/08* (2013.01); *B60K 6/26* (2013.01); *B60K 6/40* (2013.01); *B60K 6/405* (2013.01); *B60K 6/445* (2013.01); *H02K 5/16* (2013.01); *H02K 5/161* (2013.01); *H02K 7/116* (2013.01); *H02K 7/14* (2013.01)

(58) Field of Classification Search
CPC ............ H02K 5/08; H02K 5/16; H02K 5/161; H02K 5/1732; H02K 7/006; H02K 7/116; H02K 7/14; B60K 6/26
USPC .......................................... 310/89
See application file for complete search history.

(56) References Cited

U.S. PATENT DOCUMENTS

| | | | | |
|---|---|---|---|---|
| 5,932,945 A | * | 8/1999 | Volz ...................... | B60T 8/4022 310/67 R |
| 2012/0229005 A1 | * | 9/2012 | Tominaga ............ | B62D 5/0406 310/68 B |
| 2012/0244021 A1 | * | 9/2012 | Umeyama ............... | F01C 21/10 417/360 |
| 2013/0081893 A1 | * | 4/2013 | Kajihara .................. | B62M 7/12 180/220 |

(Continued)

FOREIGN PATENT DOCUMENTS

| | | |
|---|---|---|
| JP | 2016-158437 A | 9/2016 |
| JP | 2017-040352 A | 2/2017 |

*Primary Examiner* — Jermele M Hollington
*Assistant Examiner* — Rashad H Johnson
(74) *Attorney, Agent, or Firm* — Oliff PLC

(57) ABSTRACT

A vehicle electric motor housing device comprises: a case housing an electric motor, a support member rotatably supporting a rotor shaft of the electric motor, and an insulating member insulating the case from the support member, the insulating member including an insulating layer and a protective layer, the protective layer being disposed between the insulating layer and at least one of the case and the support member facing the insulating layer, and the protective layer having higher strength than the insulating layer.

7 Claims, 5 Drawing Sheets

(56) References Cited

U.S. PATENT DOCUMENTS

2014/0341757 A1* 11/2014 Obata ................ F04C 2/00
              417/231
2016/0248293 A1* 8/2016 Takeno ............. B60K 6/445

* cited by examiner

VEHICLE ELECTRIC MOTOR HOUSING DEVICE

This application claims priority from Japanese Patent Application No. 2017-104026 filed on May 25, 2017, the disclosure of which is herein incorporated by reference in its entirety.

TECHNICAL FIELD

The present invention relates to a vehicle electric motor housing device housing an electric motor and to a technique of suppressing occurrence of electric corrosion on a closed circuit passing through a case housing an electric motor and through a rotor shaft of the electric motor and a support member supporting the rotor shaft, for example.

BACKGROUND ART

A hybrid vehicle is known that includes a hybrid-vehicle electric motor housing device including a case housing an electric motor, a rotor shaft of the electric motor, and a support member supporting the rotor shaft.

For example, this corresponds to an electric motor housing device of a hybrid vehicle of Patent Document 1. In the hybrid-vehicle electric motor housing device of Patent Document 1, a support member rotatably supporting a rotor shaft of an electric motor is fastened to a case. One end portion of the rotor shaft is rotatably supported by the support member via a bearing, and the other end portion is also rotatably supported by the case via a bearing.

In this case, since a shaft voltage is generated in the rotor shaft due to the drive of the electric motor, an insulating plate (insulating member) is disposed between the case and the support member so as not to cause electric corrosion attributable to a current caused by the shaft voltage and flowing through the bearing in a closed circuit including the rotor shaft, the support member, and the case.

PRIOR ART DOCUMENT

Patent Document

Patent Document 1: Japanese Laid-Open Patent Publication No. 2016-158437

SUMMARY OF THE INVENTION

Technical Problem

Surfaces of the case and the support member with the insulating plate interposed therebetween are not necessarily flat, and protrusions may exist on the surfaces. For example, the protrusions include burrs generated by machining such as shearing and cutting of the case and the support member, burrs generated in a portion located at a joint of a metallic mold in the case of metallic molding and chips generated and adhered at the time of polishing.

The thickness of the insulating plate must be a thickness achieving a certain degree of rigidity for preventing occurrence of distortion and wrinkles and improving workability in assembly. On the other hand, if the thickness of the insulating plate is excessively increased, settling due to deformation, heat, etc. becomes larger in the case of bolt fastening normally used for sandwiching the insulating plate, and it becomes difficult to retain the fastening performance due to a reduction in bolt axial force, which limits the increase in thickness.

Under such circumstances, when the insulating plate is interposed between the case and the support member, burrs, chips, etc. are metal objects and relatively hard and sharp and therefore may penetrate into the insulating plate and deteriorate the insulation performance thereof.

The present invention was conceived in view of the situations and it is therefore an object of the present invention to reduce occurrence of electric corrosion by suppressing the deterioration in insulation performance of the insulating member between the case and the support member even when a protrusion is present on a surface of the case or the support member in the vehicle electric motor housing device.

Solution to Problem

To achieve the above object, a first aspect of the present invention provides a vehicle electric motor housing device comprising: a case housing an electric motor, a support member rotatably supporting a rotor shaft of the electric motor, and an insulating member insulating the case from the support member, wherein the insulating member includes an insulating layer and a protective layer, wherein the protective layer is disposed between the insulating layer and at least one of the case and the support member facing the insulating layer, and wherein the protective layer has higher strength than the insulating layer.

A second aspect of the present invention provides the vehicle electric motor housing device according to recited in the first aspect of the invention, wherein the protective layer has higher strength than the case or the support member facing the insulating layer.

A third aspect of the present invention provides the vehicle electric motor housing device according to recited in the first or second aspect of the invention, wherein the protective layer is disposed between the insulating layer and the case facing the insulating layer.

A fourth aspect of the present invention provides the vehicle electric motor housing device according to any one of the first to third aspects of the invention, wherein each of the protective layers is disposed between the insulating layer and each of the case and the support member facing the insulating layer.

A fifth aspect of the present invention provides the vehicle electric motor housing device according to recited in any one of the first to fourth aspects of the invention, wherein the protective layer is a punched-out metal plate and has a burr on a surface on the side opposite to a surface facing the insulating layer.

A sixth aspect of the present invention provides the vehicle electric motor housing device according to any one of the first to fourth aspects of the invention, wherein the protective layer is an insulating material.

A seventh aspect of the present invention provides the vehicle electric motor housing device according to any one of the first to sixth aspects of the invention, wherein the insulating member has a laminated body including the insulating layer and the protective layer.

An eighth aspect of the present invention provides the vehicle electric motor housing device according to any one of the first to seventh aspects of the invention, further comprising an inner rotation shaft disposed to penetrate the rotor shaft on the inner circumferential side of the rotor shaft, where the support member rotatably supports the rotor shaft and the inner rotation shaft.

A ninth aspect of the present invention provides the vehicle electric motor housing device according to any one of the first to eighth aspects of the invention, wherein the case includes a cylindrical main body case and a cover member closing an opening that is an end portion of the main body case, and wherein the insulating member is disposed between the cover member and the support member.

Advantageous Effects of Invention

According to the first aspect of the invention, the insulating member includes the insulating layer and the protective layer, the protective layer is disposed between the insulating layer and at least one of the case and the support member facing the insulating layer, and the protective layer has higher strength than the insulating layer. Therefore, even if a protrusion is present on the case or the support member, the protrusion is restrained from penetrating into the insulating layer as compared to when the protrusion directly contacts with the insulating layer on at least one side of the insulating layer, so that the deterioration in insulation performance of the insulating layer is suppressed.

According to the second aspect of the invention, the protective layer has higher strength than the case or the support member facing the insulating layer. Therefore, the protrusion of the case or the support member is restrained from penetrating into the insulating layer by the protective layer, so that the deterioration in insulation performance of the insulating layer is suppressed.

According to the third aspect of the invention, the protective layer is disposed between the insulating layer and the case facing the insulating layer. This suppresses the deterioration in insulation performance of the insulating layer with respect to the protrusion of the case of the insulating layer.

According to the fourth aspect of the invention, each of the protective layers is disposed between the insulating layer and each of the case and the support member facing the insulating layer. This suppresses the deterioration in insulation performance of the insulating layer with respect to the protrusions of the case and the support member on both sides of the insulating layer.

According to the fifth aspect of the invention, the protective layer is the punched-out metal plate and has the burr on the surface on the side opposite to the surface facing the insulating layer. As a result, the burr of the protective layer is restrained from penetrating into the insulating layer, and the deterioration in insulation performance of the insulating member is suppressed.

According to the sixth aspect of the invention, the protective layer is the insulating material. This suppress the deterioration in insulation performance of the insulating member, and can achieve an improvement of the insulation performance.

According to the seventh aspect of the invention, the insulating member has the laminated body including the insulating layer and the protective layer. As a result, the workability is improved at the time of assembly of the insulating member between the case and the support member.

According to the eighth aspect of the invention, the vehicle electric motor housing device further comprises the inner rotation shaft disposed to penetrate the rotor shaft on the inner circumferential side of the rotor shaft, the support member rotatably supports the rotor shaft and the inner rotation shaft. As a result, the occurrence of electric corrosion is suppressed by the common insulating member in members on the closed circuit including the rotor shaft and the case, on the closed circuit including the inner rotation shaft and the case, and on the closed circuit branching from these closed circuit.

According to the ninth aspect of the invention, the case includes the cylindrical main body case and the cover member closing the opening that is the end portion of the main body case, and the insulating member is disposed between the cover member and the support member. Therefore, since the support member is electrically insulated by the insulating member from the cover member closing the opening that is the end portion of the main body case on the support member side, the case and the support member are insulated from each other even when the case is made up of a plurality of members such as the main body case and the cover member.

MODES FOR CARRYING OUT THE INVENTION

A hybrid-vehicle electric motor housing device according to an embodiment of the present invention will now be described in detail with reference to the drawings. The present invention is not limited to a hybrid vehicle and is applicable to an electric motor housing device for a vehicle including an electric motor such as an electric vehicle (EV) and a fuel cell vehicle (FCV).

First Embodiment

Figure 1:
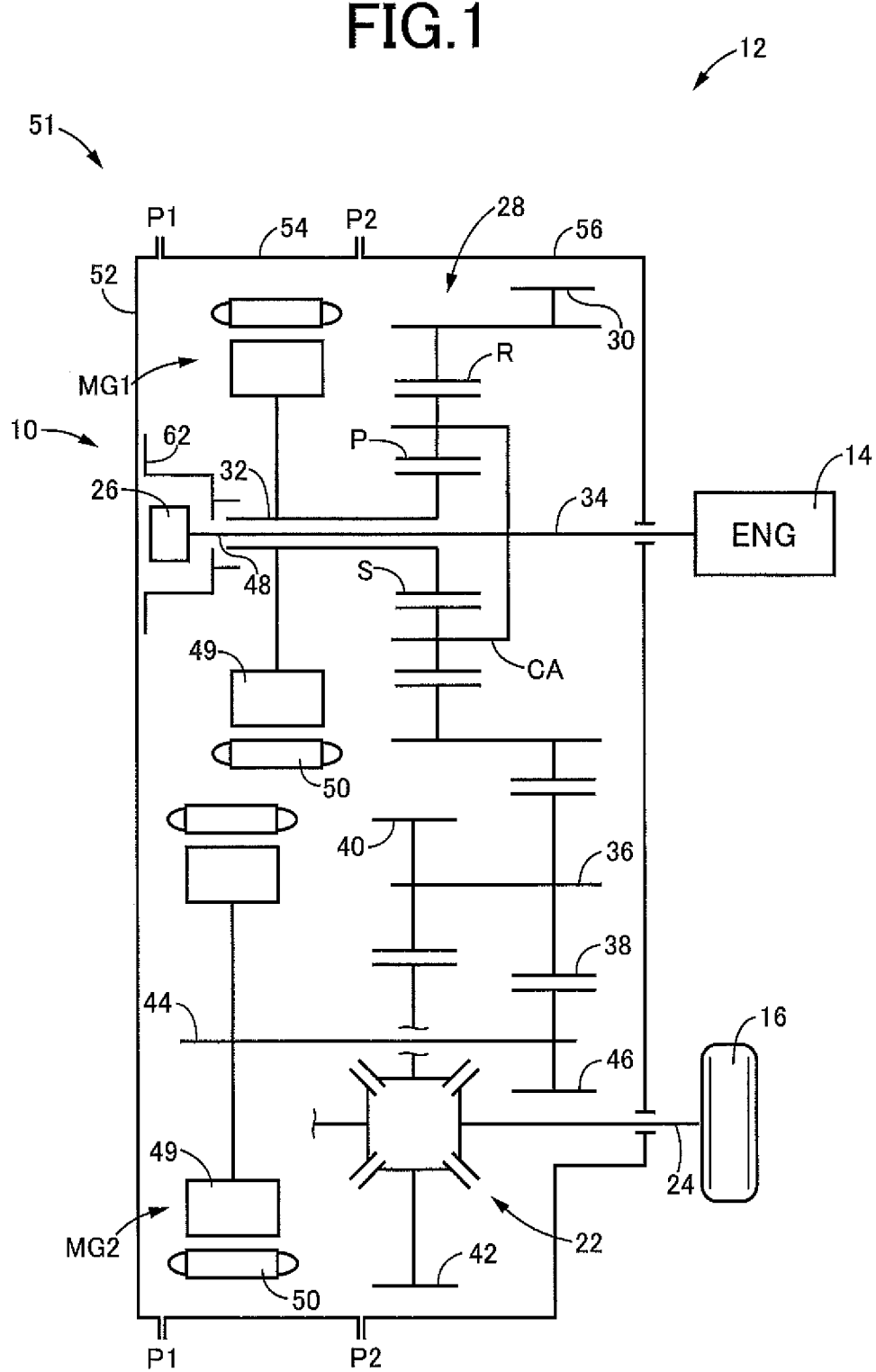
FIG. 1 is a skeleton diagram for explaining a general configuration of a drive device of a vehicle including a vehicle electric motor housing device according to an embodiment of the present invention.

FIG. 1 is a skeleton diagram for explaining a general configuration of a drive device of a hybrid vehicle 12 (hereinafter referred to as a "vehicle 12") including a hybrid-vehicle electric motor housing device 10 (hereinafter referred to as a "vehicle electric motor housing device 10) according to an embodiment of the present invention.

The vehicle 12 includes an engine 14, a first electric motor MG1, and a second electric motor MG2 serving as drive power sources for running, as well as a planetary gear device 28, a second output gear 46 coupled to a second rotor shaft 44 that is an output shaft of the second electric motor MG2, a counter shaft 36, a differential gear device 22, a pair of left and right axles 24, etc. disposed in a power transmission path between these drive power sources and a pair of left and right drive wheels 16. The vehicle 12 also includes an oil pump 26 rotationally driven by the engine 14 for generating a hydraulic oil pressure serving as a source pressure of a hydraulic control circuit and supplying a lubricating oil to the planetary gear device 28 etc.

The planetary gear device 28 is a single pinion type planetary gear device having, as three rotating elements (rotating members), a sun gear S that is a rotating element coupled to a first rotor shaft 32 of the first electric motor MG1, a ring gear R that is a rotating element coupled to the drive wheels 16 in a power transmittable manner and that is meshed with the sun gear S via a pinion gear P, and a carrier CA supporting the pinion gear P such that the pinion gear P is rotatable about its axis and about an axis of the planetary gear device, and the device 28 functions as a differential mechanism. The carrier CA is coupled to the engine 14 via an input shaft 34. The ring gear R is a cylindrical member, includes an internal gear meshed with the pinion gear P, and has a first output gear 30 formed on an outer circumferential surface thereof. Therefore, the planetary gear device 28 is a power distribution mechanism distributing power output from the engine 14 to the first electric motor MG1 and the first output gear 30 and functions as an electrically controlled continuously variable transmission.

The first output gear 30 is meshed with a counter driven gear 38 integrally disposed with the counter shaft 36 parallel to the input shaft 34. A differential pinion gear 40 integrally disposed with the counter shaft 36 is engaged with a differential input gear 42 of the differential gear device 22. The second output gear 46 is meshed with the counter driven gear 38. As a result, the second electric motor MG2 is coupled to the drive wheels 16 in a power transmittable manner.

The oil pump 26 is coupled to the engine 14 through an oil pump drive shaft 48 serving as an inner rotation shaft disposed to penetrate the inner circumferential side of the first rotor shaft 32 and concentrically with the first rotor shaft 32 and through the input shaft 34 and is rotationally driven by the engine 14.

The first electric motor MG1 and the second electric motor MG2 are made up of a synchronous motor having a rotor 49 with a plurality of permanent magnets and a stator 50 generating a rotating magnetic field and, although both the motors MG1 and MG2 are motor generators having functions of a motor (electric motor) generating a rotation force and a generator (electric generator) generating a rotation reaction force, the first electric motor MG1 has at least the function of a generator while the second electric motor MG2 has at least the function of a motor.

In the vehicle 12 configured as described above, the power from the engine 14 and the first electric motor MG1 is transmitted through the planetary gear device 28 to the first output gear 30 and is transmitted through the counter driven gear 38 and the differential pinion gear 40 disposed on the counter shaft 36 to the differential input gear 42 of the differential gear device 22. The power from the second electric motor MG2 is transmitted through the second rotor shaft 44 and the second output gear 46 to the counter driven gear 38 and is transmitted through the differential pinion gear 40 to the differential input gear 42. Therefore, the vehicle 12 has the engine 14, the first electric motor MG1, and the second electric motor MG2 used as the drive power sources for running.

The vehicle 12 also includes a transaxle case 51 that is a non-rotating member acting as a case housing the first electric motor MG1, the second electric motor MG2, the planetary gear device 28, the counter shaft 36, the differential gear device 22, etc., excluding the engine 14. The transaxle case 51 is made of, for example, an aluminum alloy formed from an aluminum material for casting having low aluminum purity and has high strength.

In the transaxle case 51, a rear cover 52, a cylindrical first main body case 54, and a bottomed cylindrical second main body case 56 arranged in order from the side opposite to the engine 14 are respectively combined at a mating surface P1 between the rear cover 52 and the first main body case 54 and a mating surface P2 between the first main body case 54 and the second main body case 56 and fastened to each other. The rear cover 52 is a constituent member of the transaxle case 51 and functions as a cover member closing an opening that is an end portion of the first main body case 54 on the oil pump body 62 side described later.

Figure 2:
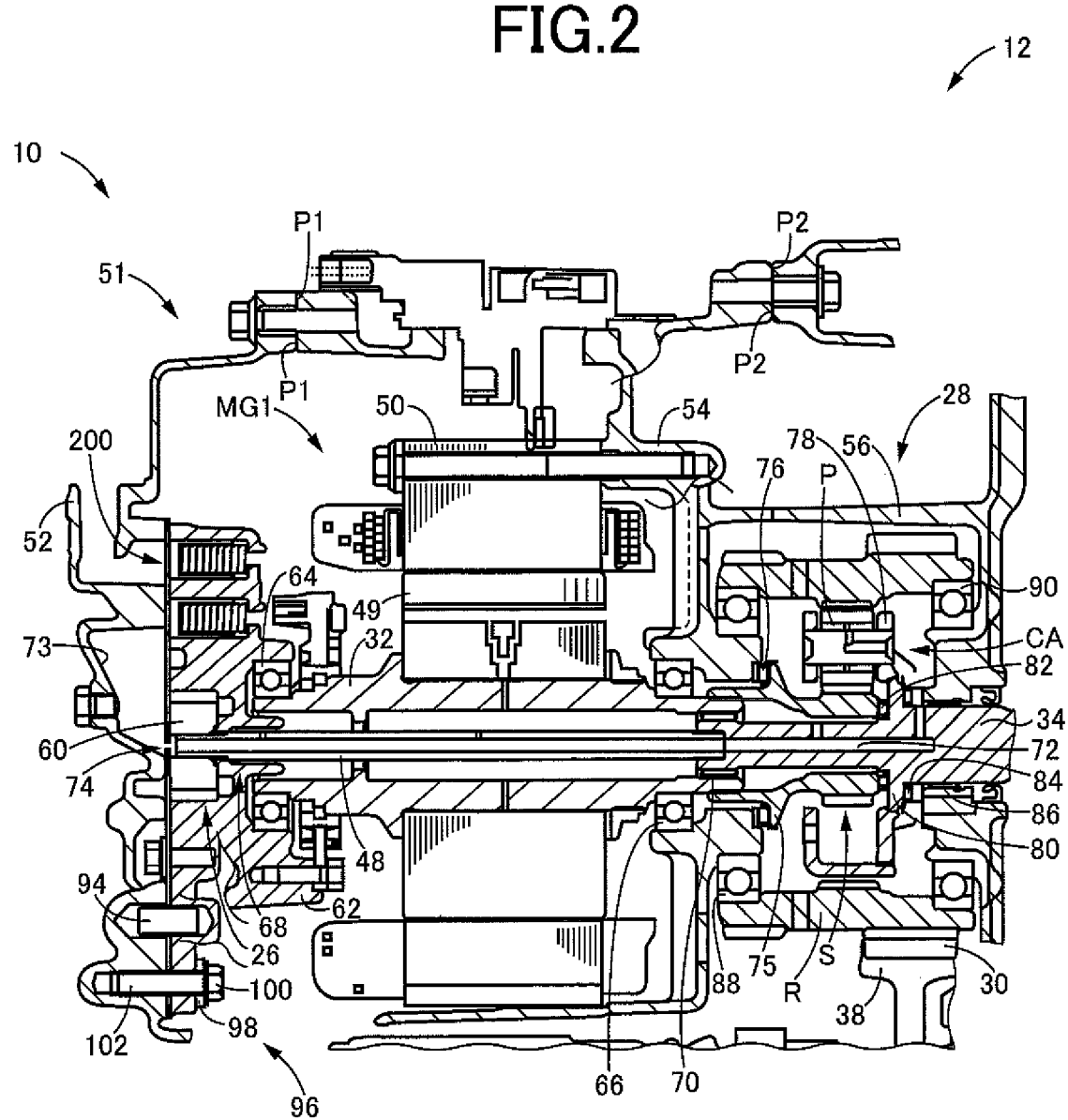
FIG. 2 is a cross-sectional view of a main portion of the drive device including the vehicle electric motor housing device of FIG. 1.

FIG. 2 is a cross-sectional view of a main portion of the drive device including the vehicle electric motor housing device 10 of FIG. 1.

The vehicle 12 includes the oil pump body 62 which has a recessed portion opened toward the rear cover 52 formed for accommodating a pump rotor 60 of the oil pump 26 and functions as a support member rotatably supporting the oil pump drive shaft 48 transmitting the power from the engine 14 to the oil pump 26 and the first rotor shaft 32 of the first electric motor MG1.

One end portion, i.e., an end portion on the rear cover 52 side, of the first rotor shaft 32 of the first electric motor MG1 is rotatably supported by the oil pump body 62 via a first ball bearing 64, and the other end portion, i.e., an end portion on the planetary gear device 28 side, is rotatably supported by the first main body case 54 via a second ball bearing 66. The end portion of the first rotor shaft 32 on the second ball bearing 66 side is coupled by spline fitting to the sun gear S that is the rotating element of the planetary gear device 28.

The oil pump drive shaft 48 is disposed to concentrically penetrate the inner circumferential side of the first rotor shaft 32 of the first electric motor MG1. The oil pump drive shaft 48 has an end portion on the rear cover 52 side coupled to the pump rotor 60 of the oil pump 26 and has an end portion on the side opposite to the rear cover 52 coupled to an end portion of the input shaft 34. The other end of the input shaft 34 is coupled to the engine 14. The end portion of the oil pump drive shaft 48 on the pump rotor 60 side is relatively rotatably supported by the oil pump body 62 via a bush 68. The end portion of the oil pump drive shaft 48 on the input shaft 34 side is relatively rotatably supported by the first rotor shaft 32 via the input shaft 34 and a first needle bearing 70. A shaft center oil passage 72 is formed on the inner circumferential side of the oil pump drive shaft 48, and radial oil passages are respectively disposed in the radial direction of the oil pump drive shaft 48 and the first rotor shaft 32. The lubricating oil delivered from the oil pump 26 driven by the engine 14 is supplied through the shaft center oil passage 72 and the radial oil passages to the members in the transaxle case 51 such as the first electric motor MG1 and the planetary gear device 28.

An insulating member 200 described later has a through-hole 74 allowing the shaft center oil passage 72 to communicate with an oil passage 73 formed between the insulating member 200 and the rear cover 52. The lubricating oil discharged from the oil pump 26 is supplied also through the oil passage 73 to the members in the transaxle case 51.

The sun gear S of the planetary gear device 28 is a cylindrical member and has a first thrust bearing 76 receiving an axial load interposed between the first main body case 54 and a flange portion 75 formed from a cylindrical outer circumferential surface of the sun gear S toward the outer circumferential side. The carrier CA has a pinion shaft rotatably supporting the pinion gear P and a pair of disk-shaped supporting walls supporting both ends of the pinion gear P. The input shaft 34 has a wall portion 80 formed to extend from an outer circumferential surface thereof toward the outer circumferential side, and one of the supporting walls supporting the both ends of the pinion gear P is a support wall 78 on the side opposite to the first electric motor MG1 and is coupled to the wall portion 80. One end of the sun gear S on the side opposite to the first electric motor MG1 includes an annular end surface, and a second thrust bearing 82 is interposed between the annular end surface and the wall portion 80. A third thrust bearing 84 is interposed between the wall portion 80 and the second main body case 56 and a second needle bearing 86 is interposed between the outer circumferential surface of the input shaft 34 and the second main body case 56.

The input shaft 34 is rotatably supported by the transaxle case 51 through the second needle bearing 86 and the first needle bearing 70. A third ball bearing 88 is interposed between an inner circumferential surface of an end portion of the ring gear R on the side opposite to the first output gear 30 and the first main body case 54, and a fourth ball bearing 90 is interposed between an inner circumferential surface of an end portion of the ring gear R on the first output gear 30 side and the second main body case 56. The first output gear 30 is meshed with the counter driven gear 38 disposed integrally with the counter shaft 36 parallel to the input shaft 34.

Due to the drive of the first electric motor MG1, a shaft voltage is generated in the first rotor shaft 32 and the oil pump drive shaft 48.

This leads to establishment of a first closed circuit including the first rotor shaft 32 and the transaxle case 51, a second closed circuit including the oil pump drive shaft 48 and the transaxle case 51, and a third closed circuit branching from the first and second closed circuits, and the insulating member 200 is disposed so as not to cause electric corrosion attributable to a current caused by the shaft voltage of the first electric motor MG1 and flowing through components interposed in these closed circuits, for example, the first ball bearing 64, the second ball bearing 66, the pump rotor 60, and the first needle bearing 70. The insulating member 200 corresponds to the insulating member insulating the transaxle case 51 housing the first electric motor MG1 from the oil pump body 62 that rotatably supports the first rotor shaft 32 of the first electric motor MG1 and the oil pump drive shaft 48 disposed to penetrate the first rotor shaft 32 on the inner circumference side of the first rotor shaft 32. The insulating member 200 prevents the first closed circuit and the second closed circuit as well as the third closed circuit branching from the first and second closed circuits partially including the transaxle case 51 from being formed when the vehicle 12 houses the first electric motor MG1 in this way, and thereby suppresses occurrence of the electric corrosion of the members on the closed circuits.

The rear cover 52 and the oil pump body 62 are positioned by an insulating pin 94 not allowing electric conduction between the oil pump body 62 and the transaxle case 51. While the insulating member 200 is interposed between the rear cover 52 and the oil pump body 62, the insulating pin 94 is fitted into a cylindrical hole of the rear cover 52 on the one end portion side having a surface subjected to an insulating coating treatment with resin or ceramics, for example, and is press-fitted into a cylindrical hole of the oil pump body 62 on the other end portion side. The rear cover 52 and the oil pump body 62 are fastened by an insulating bolt 96 not allowing electric conduction between the transaxle case 51 and the oil pump body 62. The insulating bolt 96 has an electrically insulated insulating washer 98 and is screwed to a female screw of the rear cover 52 with the insulating washer 98 interposed between a bolt head 100 and the oil pump body 62 such that a cylindrical gap is disposed between a bolt shank 102 and the oil pump body 62.

Figure 3:
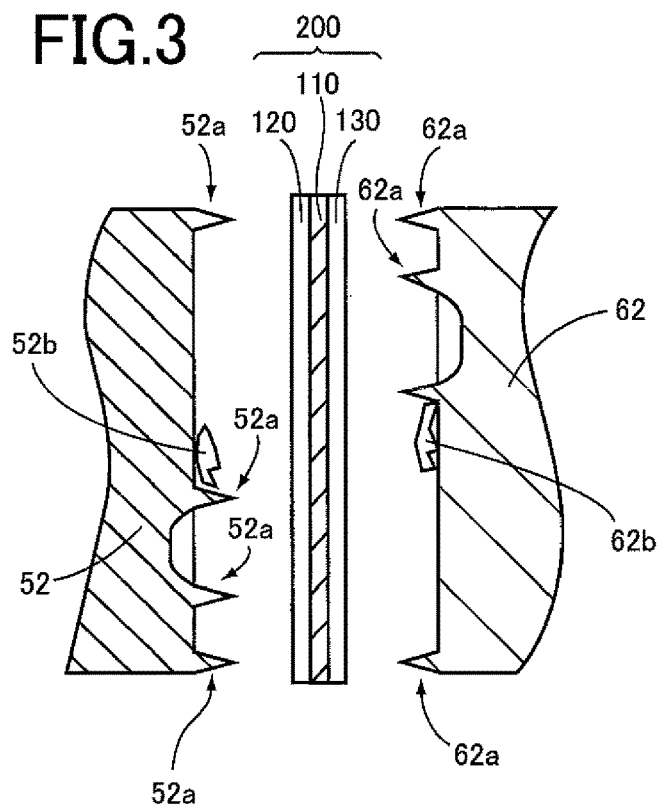
FIG. 3 is an enlarged schematic cross-sectional view of a main portion before assembly of the vehicle electric motor housing device of FIGS. 1 and 2.
Figure 4:
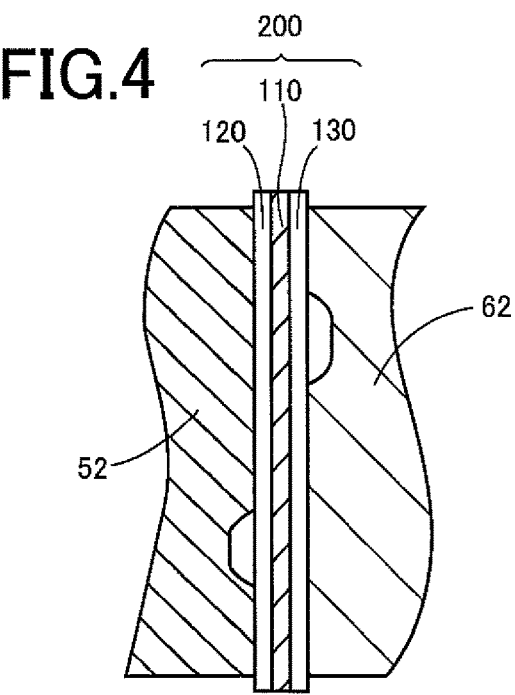
FIG. 4 is an enlarged schematic cross-sectional view of the main portion after the assembly.

FIG. 3 is an enlarged schematic cross-sectional view of a main portion before assembly of the vehicle electric motor housing device 10 of FIGS. 1 and 2, and FIG. 4 is an enlarged schematic cross-sectional view of the main portion after the assembly.

The insulating member 200 includes an insulating layer 110, a rear cover side protective layer 120, and an oil pump body side protective layer 130. The rear cover side protective layer 120 is disposed on the side of the rear cover 52 facing the insulating layer 110, and the oil pump body side protective layer 130 is disposed on the side of the oil pump body 62 facing the insulating layer 110. The rear cover 52 and the oil pump body 62 are opposite to each other with the insulating member 200 interposed therebetween and are fastened to each other. Therefore, the insulating member 200 is a laminated body including the rear cover side protective layer 120 and the oil pump body side protective layer 130 in the thickness direction of the insulating layer 110.

In this embodiment, the material of the insulating layer 110 is rubber excellent in cost and workability, for example. The rear cover side protective layer 120 and the oil pump body side protective layer 130 are members punched out by press working from a stainless-steel plate or a steel plate, for example.

On a surface of the rear cover 52, protrusions may exist due to burrs 52a generated by machining such as shearing and cutting and/or generated in a portion located at a joint of a metallic mold in the case of metallic molding, chips 52b generated and adhered at the time of polishing, etc. Similarly, also on a surface of the oil pump body 62, protrusions may exist due to burrs 62a, adhesion of chips 62b, etc. The burrs 52a, 62a, the chips 52b, 62b, etc. are metal objects and are generally hard and sharp.

In this embodiment, the rear cover side protective layer 120 and the oil pump body side protective layer 130 have higher strength than the insulating layer 110.

The high strength in this case means that rigidity is high while hardness is high and means that a layer is hardly scratched and hardly deformed. For example, this is judged by the presence/absence and size of scratches when two materials are rubbed against each other. Therefore, the rear cover side protective layer 120 and the oil pump body side protective layer 130 have higher hardness than the insulating layer 110.

When the rear cover 52 and the oil pump body 62 are assembled by the insulating bolt 96 via the insulating member 200, the burrs 52a and the chips 52b are pressed and flattened by the rear cover side protective layer 120, and the burrs 62a and the chips 62b are pressed and flattened by the oil pump body side protective layer 130.

In this way, the rear cover 52 is brought into contact with the insulating member 200 along with the burrs 52a and the chips 52b pressed and flattened. Similarly, the oil pump body 62 is brought into contact with the insulating member 200 along with the burrs 62a and the chips 62b pressed and flattened.

According to the insulating member 200 of this embodiment, since the rear cover side protective layer 120 and the oil pump body side protective layer 130 have higher strength than the insulating layer 110, the protrusions such as the burrs 52a, the chips 52b, the burrs 62a, and chips 62b are restrained from penetrating into the insulating layer 110 as compared to when the rear cover 52 and/or the oil pump body 62 are/is directly assembled to the insulating layer 110. This suppresses deterioration in insulation performance of the insulating layer 110 of the insulating member 200 and suppresses the occurrence of electric corrosion attributable to the current flowing through the bearings due to the shaft voltage of the first rotor shaft 32 and the oil pump drive shaft 48. In other words, since the insulating member 200 is assembled between the rear cover 52 and the oil pump body 62 rotatably supporting the first rotor shaft 32 and the oil pump drive shaft 48, the occurrence of electric corrosion is suppressed by the common insulating member 200 in members on the closed circuit including the first rotor shaft 32 and the rear cover 52, on the closed circuit including the oil pump drive shaft 48 and the rear cover 52, and on the closed circuit branching from these closed circuit.

Second Embodiment

Figure 5:
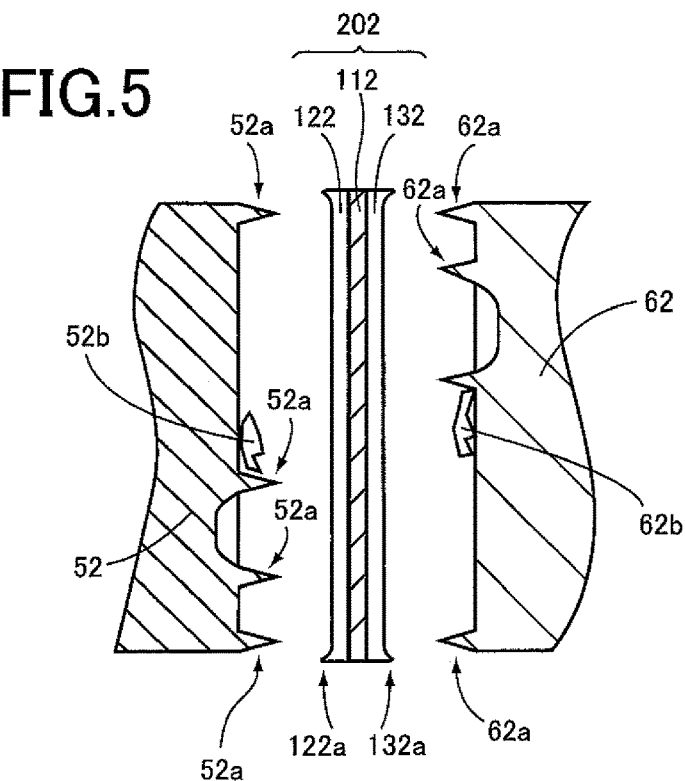
FIG. 5 is an enlarged schematic cross-sectional view of a main portion before assembly of a vehicle electric motor housing device according to another embodiment of the present invention.
Figure 6:
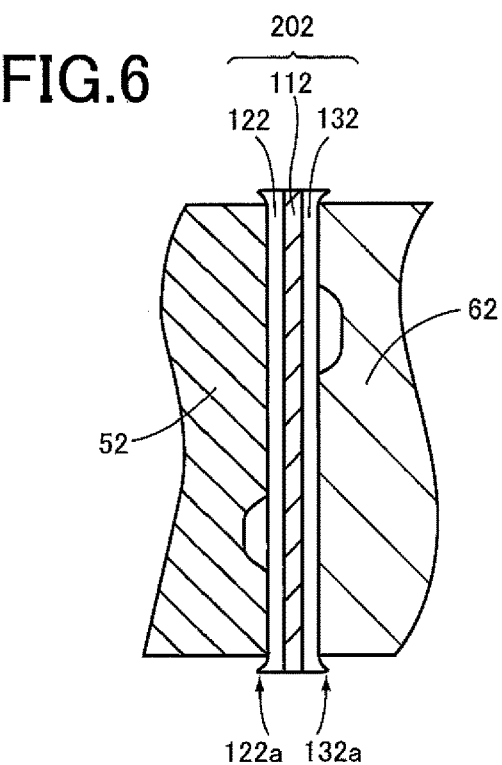
FIG. 6 is an enlarged schematic cross-sectional view of the main portion after the assembly.

FIG. 5 is an enlarged schematic cross-sectional view of a main portion before assembly of a vehicle electric motor housing device according to another embodiment of the present invention, and FIG. 6 is an enlarged schematic cross-sectional view of the main portion after the assembly.

An insulating member 202 according to this embodiment is substantially the same as the insulating member 200 according to the first embodiment except that a rear cover side protective layer 122 and an oil pump body side protective layer 132 include respective burrs 122a, 132a. For example, the burrs 122a, 132a are formed on the punch side of a punched circumferential edge portion when a metal plate made of a metal material is punched by using a die and a punch.

The rear cover side protective layer 122 is disposed such that the burr 122a included in the rear cover side protective layer 122 is positioned on a surface opposite to a surface facing the insulating layer 112. Therefore, the burr 122a included in the rear cover side protective layer 122 is disposed to face the rear cover 52. The oil pump body side protective layer 132 is disposed such that the burr 132a included in the oil pump body side protective layer 132 is positioned on a surface opposite to a surface facing the insulating layer 112. Therefore, the burr 132a of the oil pump body side protective layer 132 is disposed to face the oil pump body 62.

When the rear cover 52 and the oil pump body 62 are assembled by the insulating bolt 96 via the insulating member 202, the burrs 52a and the chips 52b are pressed and flattened by the rear cover side protective layer 122, and the burrs 62a and the chips 62b are pressed and flattened by the oil pump body side protective layer 132. In this way, the rear cover 52 is brought into contact with the insulating member 202 along with the burrs 52a and the chips 52b pressed and flattened. Similarly, the oil pump body 62 is brought into contact with the insulating member 202 along with the burrs 62a and the chips 62b pressed and flattened. Since the rear cover side protective layer 122 and the oil pump body side protective layer 132 have higher strength than the insulating layer 112, the protrusions such as the burrs 52a, the chips 52b, the burrs 62a, and chips 62b are restrained from penetrating into the insulating layer 112 as compared to when the rear cover 52 and/or the oil pump body 62 are/is directly assembled to the insulating layer 112. This suppresses deterioration in insulation performance of the insulating layer 112 of the insulating member 202. In this case, the burr 122a included in the rear cover side protective layer 122 and the burr 132a included in the oil pump body side protective layer 132 are disposed on the sides opposite to the surface of the rear cover side protective layer 122 and the surface of the oil pump side protective layer 132 facing the insulating layer 112 and therefore do not penetrate into the insulating layer 112 of the insulating member 202.

According to the insulating member 202 of this embodiment, by assembling the rear cover 52 and the oil pump body 62 via the insulating member 202, the protrusions on the surface of the rear cover 52 or the oil pump body 62 can be restrained from penetrating into the insulating layer 112, and the burr 122a included in the rear cover side protective layer 122 or the burr 132a included in the oil pump body side protective layer 132 can be restrained from penetrating into the insulating layer 112. Therefore, the deterioration in insulation performance of the insulating layer 112 of the insulating member 202 can be suppressed.

Insulating members 204, 206 according to third and fourth embodiments described below have substantially the same configuration as the insulating member 200 or the insulating member 202 according to the first or second embodiment except a configuration of a laminated body in which the insulating and protective layers are entirely or partially laminated.

Third Embodiment

Figure 7:
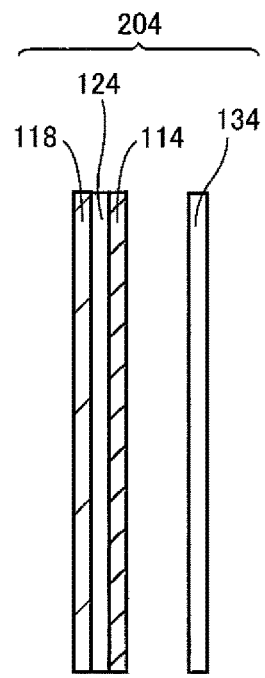
FIG. 7 is a schematic cross-sectional view of the insulating member according to still another embodiment of the present invention.

FIG. 7 is a schematic cross-sectional view of the insulating member 204 according to the third embodiment.

The insulating member 204 includes, for example, a laminated body in which a rear cover side protective layer 124 is coated on both surfaces in the thickness direction with an insulating layer 114 made of rubber and another layer 118 having an insulating function. The insulating member 204 is formed by lamination arrangement of this laminated body and an oil pump body side protective layer 134 facing the insulating layer 114 of the laminated body. In this embodiment, the rear cover side protective layer 124 and the oil pump body side protective layer 134 have higher strength than the insulating layer 114.

According to the insulating member 204 of this embodiment, since the rear cover side protective layer 124 is coated with the insulating layer 114, the insulating layer 114 can be made thinner. As a result, an amount of settling of the insulating layer 114 is made smaller, and an amount of reduction in axial force is suppressed at the time of fastening of bolts assembling the rear cover 52 and the oil pump body 62 via the insulating member 204, so that an increase in the number of bolts is suppressed. Additionally, since the insulating layer 114 and the rear cover side protective layer 124 are integrated, the workability can be improved when the rear cover 52 and the oil pump body 62 are assembled via the insulating member 204.

Fourth Embodiment

Figure 8:
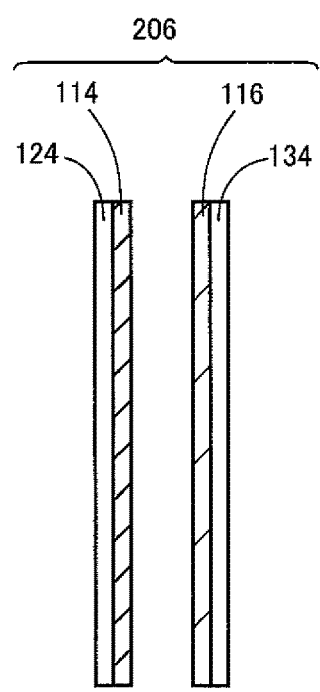
FIG. 8 is a schematic cross-sectional view of the insulating member according to still another embodiment of the present invention.

FIG. 8 is a schematic cross-sectional view of the insulating member 206 according to the fourth embodiment.

The insulating member 206 is formed by, for example, preparing a laminated body in which the rear cover side protective layer 124 is coated on one surface in the thickness direction with the insulating layer 114 made of rubber and a laminated body in which the oil pump body side protective layer 134 is coated on one surface in the thickness direction with an insulating layer 116 made of rubber, and by superposing these laminated bodies in the thickness direction such that the insulating layer 114 and the insulating layer 116 face each other. As described above, the insulating member 206 may be formed by arranging a plurality of laminated bodies each including an insulating layer and a rear cover side protective layer or an oil pump body side protective layer. In this case, the insulating layers 114, 116 both function as an insulating layer. In this embodiment, the rear cover side protective layer 124 has higher strength than the insulating layer 114, and the oil pump body side protective layer 134 has higher strength than the insulating layer 116.

According to the insulating member 206 of this embodiment, by superposing a plurality of the laminated bodies, i.e. the laminated body in which the insulating layer 114 and the rear cover side protective layer 124 are integrated and the laminated body in which the insulating layer 116 and the oil pump body side protective layer 134 are integrated, the workability can be improved when the rear cover 52 and the oil pump body 62 are assembled via the insulating member 206.

Although the embodiments of the present invention have been described with reference to the drawings, the present invention is also applicable in other forms.

For example, in the third and fourth embodiments, a burr etc. may be present on the surface of the protective layer as in the second embodiment, and the burr is preferably disposed on the side opposite to the surface facing the insulating layer. Even in this case, the burr included in the protective layer is restrained from penetrating into the insulating layer.

In each of the first to fourth embodiments, the rear cover side protective layer and the oil pump body side protective layer have higher strength than the insulating layer, and it is preferable that these layers have higher strength than the rear cover 52 or the oil pump body 62 facing thereto. Therefore, the rear cover side protective layer and the oil pump body side protective layer each have higher hardness than the rear cover 52 or the oil pump body 62 facing thereto. In this case, the protrusions on the surfaces of the rear cover 52 and the oil pump body 62 are further restrained from penetrating into the insulating layer, and the deterioration in insulation performance of the insulating layer of the insulating member is suppressed.

In each of the first to fourth embodiments, the insulating member has the rear cover side protective layer and the oil pump body side protective layer disposed on both sides with respect to the insulating layer; however, the insulating member may be disposed on only one side. Even in this case, the protrusions on the surface of the rear cover 52 or the oil pump body 62 can be restrained from penetrating into the insulating layer on at least one side.

In each of the first to fourth embodiments, the insulating member is preferably wider than the surfaces faced by the rear cover 52 and the oil pump body 62. As a result, all the protrusions possibly present on the surfaces of the rear cover 52 and the oil pump body 62 can be restrained from penetrating into the insulating layer.

In each of the first to fourth embodiments, the oil pump body 62 serves as a support member to rotatably support the first rotor shaft 32 (rotor shaft) and the oil pump drive shaft 48 (inner rotation shaft); however, the support member may rotatably support only one of the first rotor shaft 32 and the oil pump drive shaft 48. Even when the support member supports only one of the shafts, the occurrence of electric corrosion is suppressed in the members on either the closed circuit including the first rotor shaft 32 supported by the support member and the rear cover 52 or the closed circuit including the oil pump drive shaft 48 and the rear cover 52 due to the insulating member.

In each of the first to fourth embodiments, the insulating member is wholly or includes partially a laminated body in which the insulating and protective layers are integrated with each other; however, the present invention is not limited thereto. The insulating member may include the insulating and protective layers which are superposed as separated bodies. Even in this case, the deterioration in insulation performance of the insulating member is suppressed.

In each of the first to fourth embodiments, not only rubber but also ceramics and any material without conductivity subjected to a special surface treatment are applicable to the insulating layer constituting a portion of the insulating member. The material of the protective layer may be not only a stainless-steel plate or a steel plate but also other metal plates such as aluminum and aluminum alloy, and the processing method is not limited to press working and may be other methods such as cutting. To the material of the protective layer, an insulating material such as ceramics and resin is also applicable. When the insulating material is applied, the protrusions on the surface of the rear cover or the oil pump body can be restrained from penetrating into the insulating layer to suppress the deterioration in insulation performance of the insulating member, and the protective layer itself can achieve an improvement of the insulation performance of the insulating member.

In each of the first to fourth embodiments, not only aluminum alloy but also cast materials such as magnesium and cast iron are applicable to the rear cover 52 (cover member) and the oil pump body 62 (support member), and a material other than the cast materials that has protrusions such as burrs generated at a processed end is also applicable.

Each of the first to fourth embodiments has been illustratively described in terms of not causing the electric corrosion attributable to a current caused by the shaft voltage of the first electric motor MG1 made up of a synchronous motor; however, the present invention is not limited thereto. The present invention is applicable to the second electric motor MG2 or those having other configurations as long as a shaft voltage is generated.

The above description is merely embodiments of the present invention and the present invention can be implemented in variously modified and improved forms based on the knowledge of those skilled in the art.

REFERENCE SIGNS LIST

10: Hybrid-vehicle electric motor housing device (Vehicle electric motor housing device)
32: First rotor shaft (Rotor shaft)
48: Oil pump drive shaft (Inner rotation shaft)
51: Transaxle case (Case)
52: Rear cover (Cover member)
54: First main body case (Main body case)
62: Oil pump body (Support member)
110, 112, 114, 116: Insulating layer
120, 122, 124: Rear cover side protective layer (Protective layer)

130, 132, 134: Oil pump side protective layer (Protective layer)
200, 202, 204, 206: Insulating member
MG1: First electric motor (Electric motor)

What is claimed is:

1. A vehicle electric motor housing device comprising: a case housing an electric motor, a support member rotatably supporting a rotor shaft of the electric motor, and an insulating member insulating the case from the support member,
   the insulating member including an insulating layer and a protective layer,
   the protective layer being disposed between the insulating layer and at least one of the case and the support member facing the insulating layer,
   the protective layer having higher strength than the insulating layer, and
   the protective layer being a punched-out metal plate having (i) a first surface facing the insulating layer, (ii) a second opposite surface facing away from the insulating surface, and (iii) a burr on the second opposite surface.

2. The vehicle electric motor housing device according to claim 1, wherein
   the protective layer has higher strength than the case or the support member facing the insulating layer.

3. The vehicle electric motor housing device according to claim 1, wherein
   the protective layer is disposed between the insulating layer and the case facing the insulating layer.

4. The vehicle electric motor housing device according to claim 1, wherein
   the protective layer includes a first protective layer disposed between the insulating layer and the case and a second protective layer disposed between the insulating layer and the supporting member.

5. The vehicle electric motor housing device according to claim 1, wherein
   the insulating member has a laminated body including the insulating layer and the protective layer.

6. The vehicle electric motor housing device according to claim 1, further comprising an inner rotation shaft disposed to penetrate the rotor shaft on an inner circumferential side of the rotor shaft, wherein
   the support member rotatably supports the rotor shaft and the inner rotation shaft.

7. The vehicle electric motor housing device according to claim 1, wherein
   the case includes a cylindrical main body case and a cover member closing an opening that is an end portion of the main body case, and
   the insulating member is disposed between the cover member and the support member.

* * * * *